United States Patent
Kontio et al.

(10) Patent No.: US 11,368,912 B2
(45) Date of Patent: Jun. 21, 2022

(54) MANAGING POWER CONSUMPTION OF PORTABLE DEVICES

(71) Applicant: Nokia Technologies Oy, Espoo (FI)

(72) Inventors: Jari Pekka Kontio, Tampere (FI); Teemu Ilmari Savolainen, Nokia (FI)

(73) Assignee: Nokia Technologies Oy, Espoo (FI)

( * ) Notice: Subject to any disclaimer, the term of this patent is extended or adjusted under 35 U.S.C. 154(b) by 7 days.

(21) Appl. No.: 16/965,436

(22) PCT Filed: Feb. 1, 2019

(86) PCT No.: PCT/FI2019/050076
§ 371 (c)(1),
(2) Date: Jul. 28, 2020

(87) PCT Pub. No.: WO2019/155118
PCT Pub. Date: Aug. 15, 2019

(65) Prior Publication Data
US 2021/0385753 A1    Dec. 9, 2021

(30) Foreign Application Priority Data

Feb. 6, 2018 (FI) .................................. 20185104

(51) Int. Cl.
*H04W 52/02* (2009.01)

(52) U.S. Cl.
CPC ... *H04W 52/0267* (2013.01); *H04W 52/0216* (2013.01); *H04W 52/0229* (2013.01)

(58) Field of Classification Search
CPC . H04W 52/00; H04W 52/02; H04W 52/0203; H04W 52/0209; H04W 52/0212;
(Continued)

(56) References Cited

U.S. PATENT DOCUMENTS 11,146,981 B2 * 10/2021 Lee .................... H04W 4/40
2004/0156163 A1    8/2004 Nerheim
(Continued)

FOREIGN PATENT DOCUMENTS

GB        2529857 A  *  3/2016  ............. G06F 1/329
JP     2006-520170 A     8/2006
(Continued)

OTHER PUBLICATIONS

"Lightweight Machine to Machine Technical Specification", Open Mobile Alliance, Version: 1.0.1, OMA-TS-LightweightM2M-V1_0_1-20170704-A, Jul. 4, 2017, pp. 1-141.
(Continued)

*Primary Examiner* — Robert C Scheibel
(74) *Attorney, Agent, or Firm* — Joseph C. Drish; Harrington & Smith

(57) ABSTRACT

According to an aspect, there is provided a method performed by a portable apparatus (201). Initially, configuration information comprising at least information on a target operational time and information one or more periodic actions to be performed is maintained in a memory of the portable apparatus (201). The portable apparatus (201) performs at least one of the one or more periodic actions according to the configuration information. Thereafter, the portable apparatus (201) determines an estimated remaining operational time for a current charge of a battery (202) powering the portable apparatus. After reducing the target operational time according to passing of time, the portable apparatus (201) compares the estimated remaining operational time to the target operational time. In response to the estimated remaining operational time being shorter than the target operational time, the portable apparatus (201) lengthens one or more periods of one or more respective periodic actions to reduce battery consumption.

17 Claims, 9 Drawing Sheets

(58) Field of Classification Search
CPC ......... H04W 52/0216; H04W 52/0222; H04W 52/0225; H04W 52/0229; H04W 52/0232; H04W 52/0235; H04W 52/0251; H04W 52/0254; H04W 52/0258; H04W 52/0261; H04W 52/0264; H04W 52/0267; H04W 52/0274; H04W 52/0277; H04W 52/028
See application file for complete search history.

(56) References Cited

U.S. PATENT DOCUMENTS

| | | |
|---|---|---|
| 2004/0180701 A1 | 9/2004 | Livet et al. |
| 2006/0143483 A1 | 6/2006 | Liebenow |
| 2012/0054304 A1 | 3/2012 | Pica et al. |
| 2014/0348005 A1 | 11/2014 | Futaki et al. |
| 2015/0164391 A1 | 6/2015 | Hernandez-Rosas et al. |
| 2016/0353386 A1* | 12/2016 | Sasidharan ....... H04W 52/0264 |
| 2016/0374025 A1 | 12/2016 | Burnet et al. |
| 2017/0185134 A1* | 6/2017 | Han ..................... G06F 1/3212 |
| 2017/0188308 A1 | 6/2017 | Nolan et al. |
| 2018/0279221 A1* | 9/2018 | Fuleshwar Prasad ...................... H04W 52/0254 |
| 2019/0020991 A1* | 1/2019 | Hamilton ............. H04W 4/025 |
| 2019/0215767 A1* | 7/2019 | Soloway .............. H04L 67/325 |

FOREIGN PATENT DOCUMENTS

| | | |
|---|---|---|
| WO | 2007/149732 A1 | 12/2007 |
| WO | WO-2007/149732 A1 | 12/2007 |
| WO | 2013/150339 A1 | 10/2013 |
| WO | 2015/084380 A1 | 6/2015 |
| WO | 2017/009686 A1 | 1/2017 |
| WO | 2017/109555 A1 | 6/2017 |

OTHER PUBLICATIONS

Office action received for corresponding Finnish U.S. Appl. No. 20185104, dated Sep. 7, 2018, 8 pages.

International Search Report and Written Opinion received for corresponding Patent Cooperation Treaty Application No. PCT/FI2019/050076, dated May 20, 2019, 13 pages.

Office action received for corresponding Japanese Patent Application No. 2020-542653, dated Oct. 4, 2021, 3 pages of office action and no page of translation available.

Extended European Search Report received for corresponding European Patent Application No. 19750298.2, dated Oct. 15, 2021, 9 pages.

* cited by examiner

MANAGING POWER CONSUMPTION OF PORTABLE DEVICES

RELATED APPLICATION

This application claims priority to PCT Application No. PCT/FI2019/050076, filed on Feb. 1, 2019, which claims priority to Finnish Application No. 20185104, filed on Feb. 6, 2018, each of which is incorporated herein by reference in its entirety.

FIELD OF THE INVENTION

Various example embodiments relate generally to portable communications devices, and more particularly to managing power consumption of portable communications devices.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Users of a communications device such as an Internet of Things (IoT) device or a smartphone are typically promised a certain expected operational lifetime. However, the actual operational lifetime may be shorter than the promised expected operational lifetime. For example, the device may be positioned so that signal strength of the cellular network is weak and therefore the device may end up consuming more power than expected. Similarly, the device may have problems hearing Global Positioning System (GPS) satellites or WiFi access points. Still a further example includes that the battery of the device may be aging and therefore unable to hold as much charge as when the battery was new.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Various aspects of the invention comprise a method, an apparatus, and a computer program as defined in the independent claims. Further embodiments of the invention are disclosed in the dependent claims.

BRIEF DESCRIPTION OF THE DRAWINGS

In the following, some example embodiments will be described with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
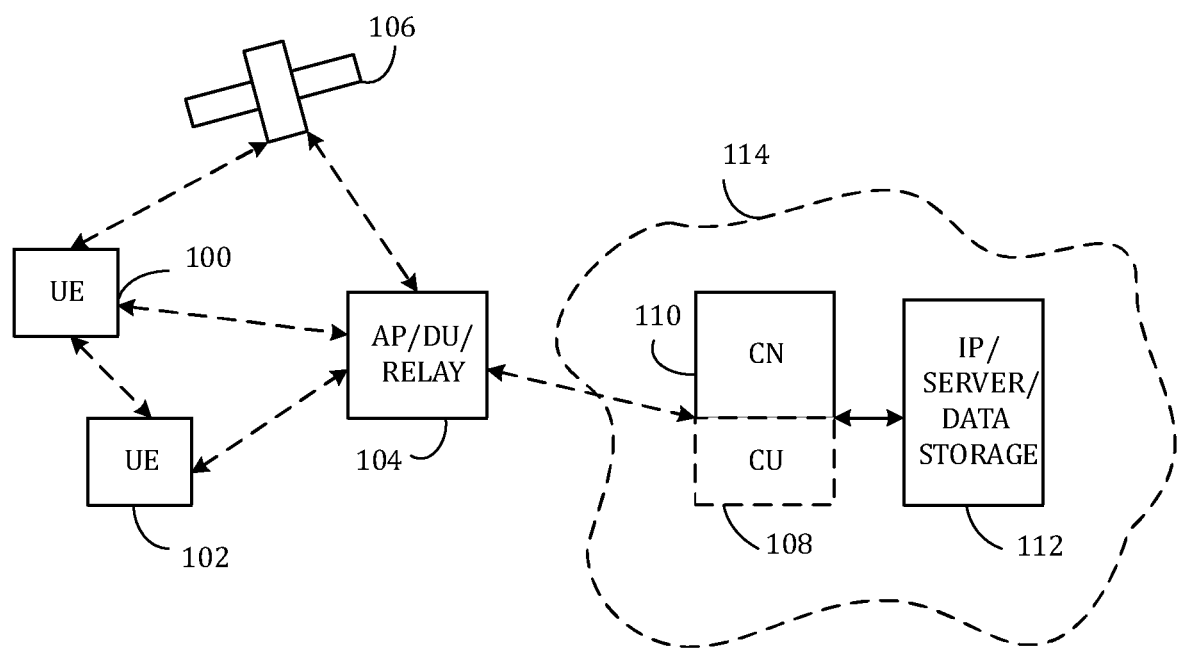
FIGS. 1 and 2 illustrate examples of communications systems to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. The system may comprise also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT (Information and Communications Technology) devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablet computers and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilise services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite 106.

The depicted system may only be an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

Figure 2:
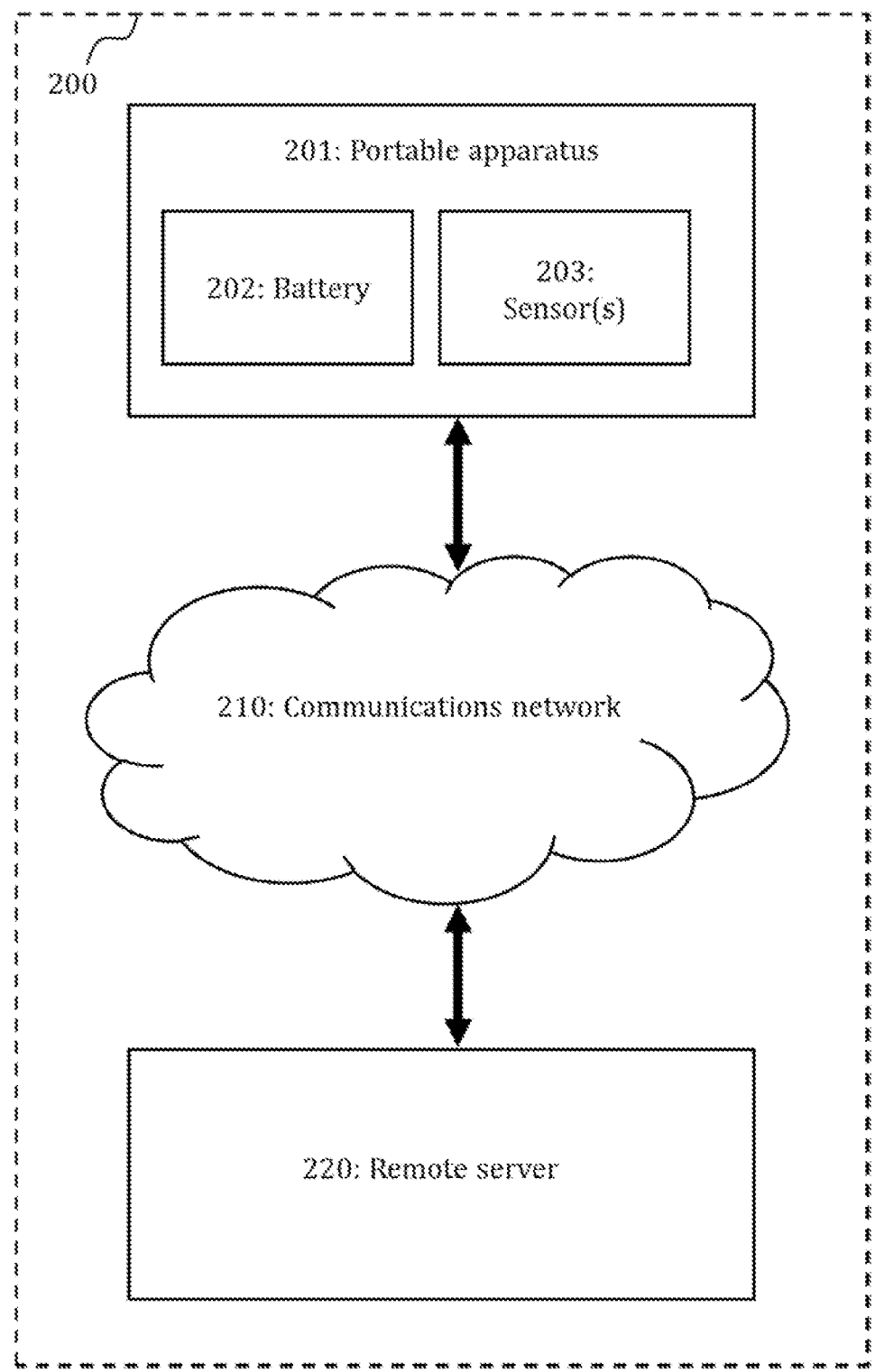

FIG. 2 depicts another example of a simplified communications system architecture 200 only showing some elements and functional entities, all being logical units, whose implementation may differ from what is shown. The connections shown in FIG. 2 are logical connections; the actual physical connections may be different. Specifically, FIG. 2 illustrates a communications system 200 in which one or more portable apparatuses 201 (only one shown in FIG. 2 for simplicity) are able to connect via a communications network 210 to at least one remote server 220. It would be possible that the system comprises also other functions and structures than those shown in FIG. 2. In some embodiments, the one or more portable apparatuses 201 may correspond to either of the user devices 100, 102 of FIG. 1 and/or the remote server 220 may correspond to the server 112 of FIG. 1.

The one or more portable apparatuses 201 may comprise any battery-powered devices which may be connected to the communications network 210 and are thus able to receive information from and transmit information to the remote server 220. The one or more portable apparatuses 201 may comprise, for example, one or more Internet of Things (IoT) devices, one or more wearable devices (e.g., smartwatches or dedicated devices), one or more mobile phones (e.g., smartphones) and/or one or more tablet computers. Each portable apparatus 201 may comprise a memory for maintaining at least configuration information of the portable apparatus 201 and a user interface at least for communicating with the user. Further, each portable apparatus 201 may be able to measure the current level of a battery 202 of the portable apparatus 201 and estimate the current level of power consumption based thereon.

The battery 202 powering each portable apparatus 201 may be any rechargeable (secondary) or non-rechargeable (primary) battery using any present or future technology. For example, the battery 202 may be a nickel-cadmium battery, nickel-zinc battery, nickel metal hydride battery or a lithium-ion battery. The type of the battery 202 is irrelevant to the invention, and therefore not described in detail here. The portable apparatus may comprise the battery 202 (an internal battery) as shown in FIG. 2 or the portable apparatus 201 may be attached to the battery 202 (an external battery) via an interface of the portable apparatus (not shown in FIG. 2). In either of the two cases, the battery 202 may be fixedly or removably attached to the portable apparatus 201. In some embodiments, a portable apparatus 201 may be powered by two or more batteries 202.

In some embodiments, each portable apparatus 201 may comprise or be connected to one or more sensors 203 (or other measurement instruments) measuring the state of the portable apparatus, the environment of the portable apparatus and/or the physiological state of the user of the portable apparatus. For example, the one or more sensors 203 may comprise at least one of a GPS-based positioning sensor (i.e., a GPS receiver with at least one antenna), a WiFi-based positioning sensor (i.e., a WiFi receiver with at least one antenna) or a Bluetooth- or Bluetooth Low Energy-based positioning sensor for monitoring the location of the portable apparatus 201. In some embodiments, any of the aforementioned positioning sensors (along with the portable apparatus 201) may be specifically configured to measure the location of the portable apparatus 201 within a pre-defined geo-fence, that is, a pre-defined virtual perimeter surrounding a real-world geographic area.

Further, the one or more sensors 203 may comprise an orientation or a gyroscopic sensor or an orientation sensor monitoring the orientation of the portable apparatus 201 or a certain part of the body to which the gyroscopic/orientation sensor is attached or an accelerometer monitoring the acceleration of the portable apparatus 201 or a certain part of the body to which the accelerometer is attached. Furthermore, the one or more sensors may comprise one or more physiological sensors such as heart rate monitors or sensors (e.g., a photoplethysmogram, PPG, sensor or an electrocardiography, EKG, sensor), sensors for monitoring posture (e.g., a gyroscopic/orientation sensor attached to certain part of the torso), pulse sensors or pulse oximetry sensors monitoring oxygen saturation. The one or more sensors 203 may also comprise one or more antennas, for example, for measuring received signal strength (e.g., received signal strength indicator, RSSI) at one or more radio frequencies used by the communication network 210 for wireless communication. The one or more sensors 203 may comprise one or more sensors integrated into the corresponding portable apparatus 201 and/or one or more separate sensors connectable to the corresponding portable apparatus.

In some embodiments, some or all portable apparatuses 201 may be devices supporting Open Mobile Alliance (OMA) Lightweight Machine-to-Machine (LwM2M) protocol. OMA LwM2M protocol is an application layer communication protocol for M2M or IoT device management. Specifically, OMA LwM2M protocol enables communications between a LWM2M server (the remote server 220 in this embodiment) and a LWM2M client, which is located in a LWM2M device (the portable apparatus 201 in this embodiment). Said protocol may be employed, for example, in communicating with the remote server 220 and specifically in configuring and performing periodic reporting of measurements and/or secondary information to the remote server 220.

In other embodiments, some or all portable apparatuses 201 may be devices supporting Message Queuing Telemetry Transport (MQTT), Hypertext Transfer Protocol (HTTP), Constrained Application Protocol (CoAP), Advanced Message Queuing Protocol (AMQP), Quick User Datagram Protocol Internet Connections (QUIC) and/or Extensible Messaging and Presence Protocol, XMPP, instead or in addition to the OMA LwM2M protocol. Message Queuing Telemetry Transport is an application-layer publish-subscribe-based messaging protocol working on top of the TCP/IP (Transmission Control Protocol/Internet Protocol). Hypertext Transfer Protocol is an application-layer transfer protocol for distributed, collaborative and hypermedia information systems. Any of MQTT, HTTP, CoAP, AMQP, QUIC and/or XMPP may be used to perform similar functions as described in the previous paragraph and in the following for OMA LwM2M.

Each portable apparatus 201 may be configured to perform periodically or semiperiodically one or more different actions which consume or drain the battery 202 (or the current charge of the battery 202 in case of a rechargeable battery). The term "semiperiodically" should be understood here and in the following to mean almost periodically or recurring at irregular intervals though possibly with certain limits placed on the irregularity of the intervals (e.g., action to be repeated with an interval of at least 15 minutes but no more than 30 minutes). The one or more different periodic or semiperiodic actions consuming the battery 202 may comprise, for example, one or more measurements using one or more sensors 203, transmission of measurement or other (secondary) information to the remote server 220, reception and processing of configuration or other information from the remote server 220 and a number of actions specific to the application of the particular portable apparatus 201. Different types of measurements may have different periods or frequencies for performing the corresponding measurement. Moreover, information provided by said measurement may be uploaded (transmitted) to the remote server 220 according to another period or frequency. Said information on said periods or frequencies may be maintained in the memory of the portable apparatus 201.

In an embodiment, the one or more portable apparatuses 201 comprise at least one Personal Emergency Response System (PERS) device. The PERS device is a dedicated device which may be configured to monitor the location and the physiological state (e.g., heart rate, posture and/or detecting falls) of a person using one or more measurement sensors 203 (e.g., a heart rate monitor, a gyroscopic/orientation sensor and/or an accelerometer). The PERS device may also periodically report these results to the remote server (e.g., a cloud server), so that caregivers of the user of the PERS device and one or more automation systems may monitor said results for possible problems, track the living habits of the user and utilize various data analytics. In some embodiments, the PERS device may be specifically configured to perform said monitoring within a pre-defined geo-fence. The PERS device may further be configured to provide emergency call functionality for the user either automatically if a certain condition is met (e.g., if the geo-fence is breached or if a measurement of a physiological signal using a sensor indicates an emergency) or via a user interface. The PERS device may be a wearable device, for example, a device worn on the wrist. The PERS device may provide under normal conditions operational times of several days (e.g., one week).

The communications network 210 providing communication between the portable apparatus(es) 201 and the remote server 220 may comprise one or more wireless networks, wherein a wireless network may be based on any mobile system, such as GSM, GPRS, LTE, 4G, 5G and beyond, and a wireless local area network, such as Wi-Fi. Furthermore, the communications network 210 may comprise one or more fixed networks or the internet.

In some embodiments, the communications network 210 may also provide communication between the one or more portable apparatuses 201 and one or more secondary network devices. Each secondary network device may be associated with at least one corresponding portable apparatus. The secondary network devices may comprise, for example, cellular phones, smartphones, smartwatches and/or personal computers. If the portable apparatus is a PERS device, the corresponding secondary network device may be a device operated by a caregiver of the user of the portable apparatus. If a problem in the operation of the PERS device is observed, the caregiver may be informed via the communications network 210.

The remote server 220 may be configured to monitor the operation of the one or more portable apparatuses 201 and communicate with the one or more portable apparatuses 201 via the communications network 210. The remote server 220 may further be configured to configure the one or more portable apparatuses 201 by transmitting configuration information to them via the communications network 210. For example, the remote server 220 may be able to control, in this way, the intervals at which the one or more portable apparatuses upload information (e.g., measurement information) to the remote server 220. The remote server 220 may be a database server and may also be connected to one or more other network devices (not shown in FIG. 2), such as a terminal device, a server and/or a database. The database server refers herein to a combination of a data storage (database) and a data management system. The data storage may be any kind of conventional or future data repository, including distributed and/or centralized storing of data, a cloud-based storage in a cloud environment, managed by any suitable data management system. The implementation of the data storage, the manner how data is stored, retrieved and updated are irrelevant to the invention, and therefore not described in detail here. Further, it should be appreciated that the location of the remote server 220 is irrelevant to the invention. The remote server 220 may be operated and maintained using one or more other network devices in the system.

Figure 3:
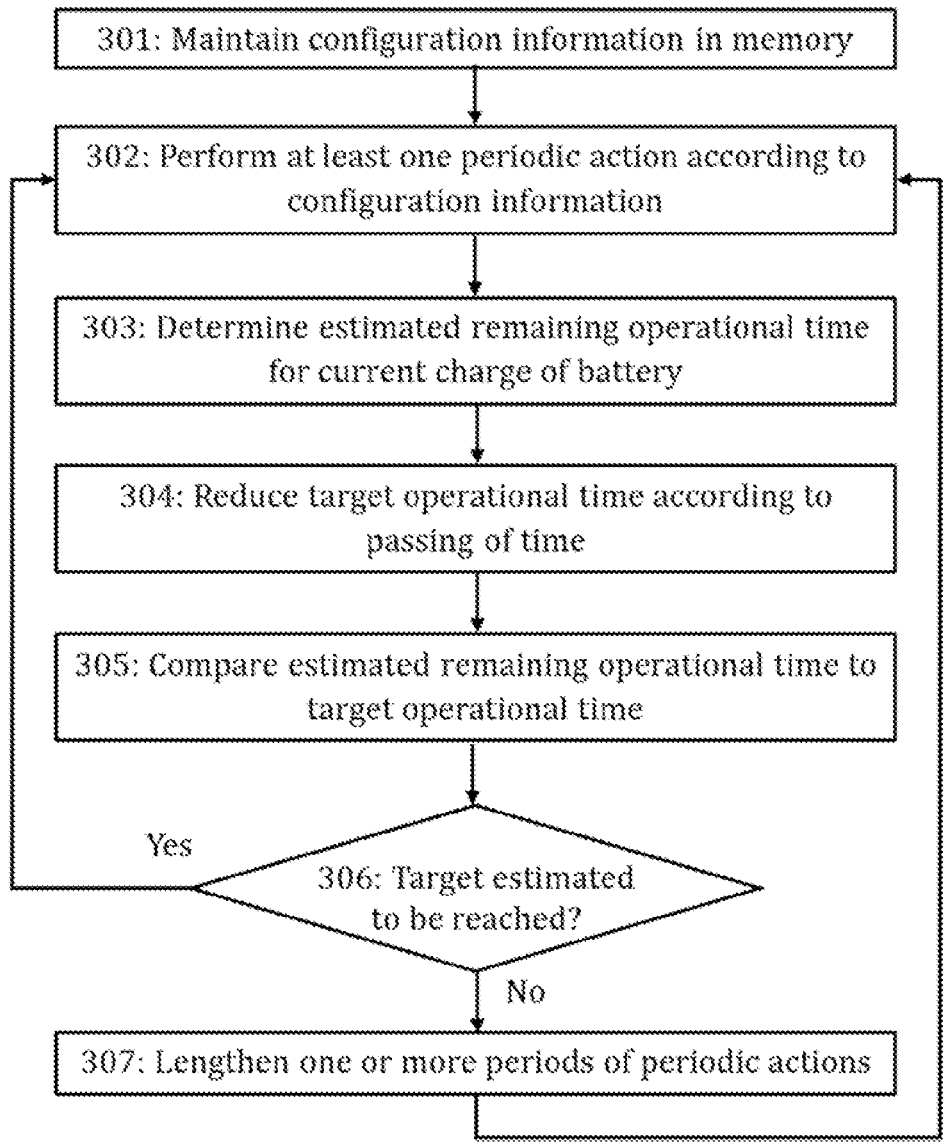
FIGS. 3 to 8 illustrate examples of processes according to embodiments.

FIG. 3 illustrates an exemplary process executed by a portable apparatus connected via a communications network to a remote server (as discussed in relation to FIG. 2) for managing the operation of the portable apparatus to maintain the promised operational lifetime. The process of FIG. 3 may be repeated periodically or semi-periodically.

Referring to FIG. 3, a portable apparatus maintains, in block 301, configuration information in a memory. The configuration information comprises at least information on a target operational time of the portable apparatus and information one or more periodic actions (e.g., measurements and uploading measurement or secondary information to the remote server) to be performed by the portable apparatus. The target operational time may correspond specifically to a current charge (possibly a full charge) of a battery powering the portable apparatus. The configuration information may have been received, e.g., via a communications network from a remote server and subsequently stored to the memory of the portable apparatus or it may have been hard-coded or otherwise persistently stored into the memory of the portable apparatus, for example, at the time of the manufacturing. The portable apparatus may store the configuration information, upon reception, to a memory.

The portable apparatus performs, in block 302, at least one of one or more periodic actions according to the configuration information. The one or more periodic actions may comprise any periodic or semiperiodic battery-consuming actions as described earlier for the portable apparatus in relation to FIG. 2.

The portable apparatus determines, in block 303, an estimated remaining operational time for a current charge of the battery. The determining may be triggered based on a timer (e.g., once every hour) or based on actions performed by the portable apparatus (e.g., every time or every fourth time data is uploaded to the remote server). Moreover, the determining may be performed in two parts so that, first, the portable apparatus measures the power consumption due to the one or more periodic actions and then estimates based thereon the remaining operational time. The determining may be based on one or more of current uptime (a measure of the time the portable apparatus has been working and available), remaining battery power, estimated operational power consumption and estimation of data transmission event cost.

The portable apparatus reduces, in block 304, the target operational time according to passing of time. Said reducing may also be performed continuously after the information on the target operational time has been received. For example, a timer counting down from the target operational time may be established. The portable apparatus compares, in block 305, the estimated remaining operational time to the target operational time (corresponding to the initial target operational time adjusted to account for passing of time).

In response to the estimated remaining operational time being shorter than the target operational time in block 306, the portable apparatus lengthens (or increases), in block 307, one or more periods of one or more respective periodic actions to reduce battery consumption. All the periods relating to the one or more periodic actions may be increased or only some of them so that the target operational life is reached (if possible). The reason for the smaller than expected operational time may be, for example, that in the current location of the portable apparatus the network coverage is poor which causes uploading information to the remote server (in this example being performed in block 302) to consume more power than in the optimal or even typical scenario. The configuration information may define the manner in which the one or more periods should be tuned for retaining the target operational time (e.g., how the periods relating to different action should be lengthened relative to each other). If the estimated remaining operational time is equal to or longer than the current target operational time in block 306 or once the one or more periods have been lengthened in block 307, the process repeats starting again from block 302. It should be noted that the periodic action(s) performed in block 302 in consequent repetitions may differ due to different periods assigned for different actions which the portable apparatus is configured to perform.

In some embodiments, the one or more periods may be lengthened so that the estimated operational time is increased, but the current target operational time is still not reached. This may occur, for example, if it is not possible or feasible to reach the target operational time for various reason (e.g., due to certain hard limits imposed on the period of at least some of the actions).

Figure 4:
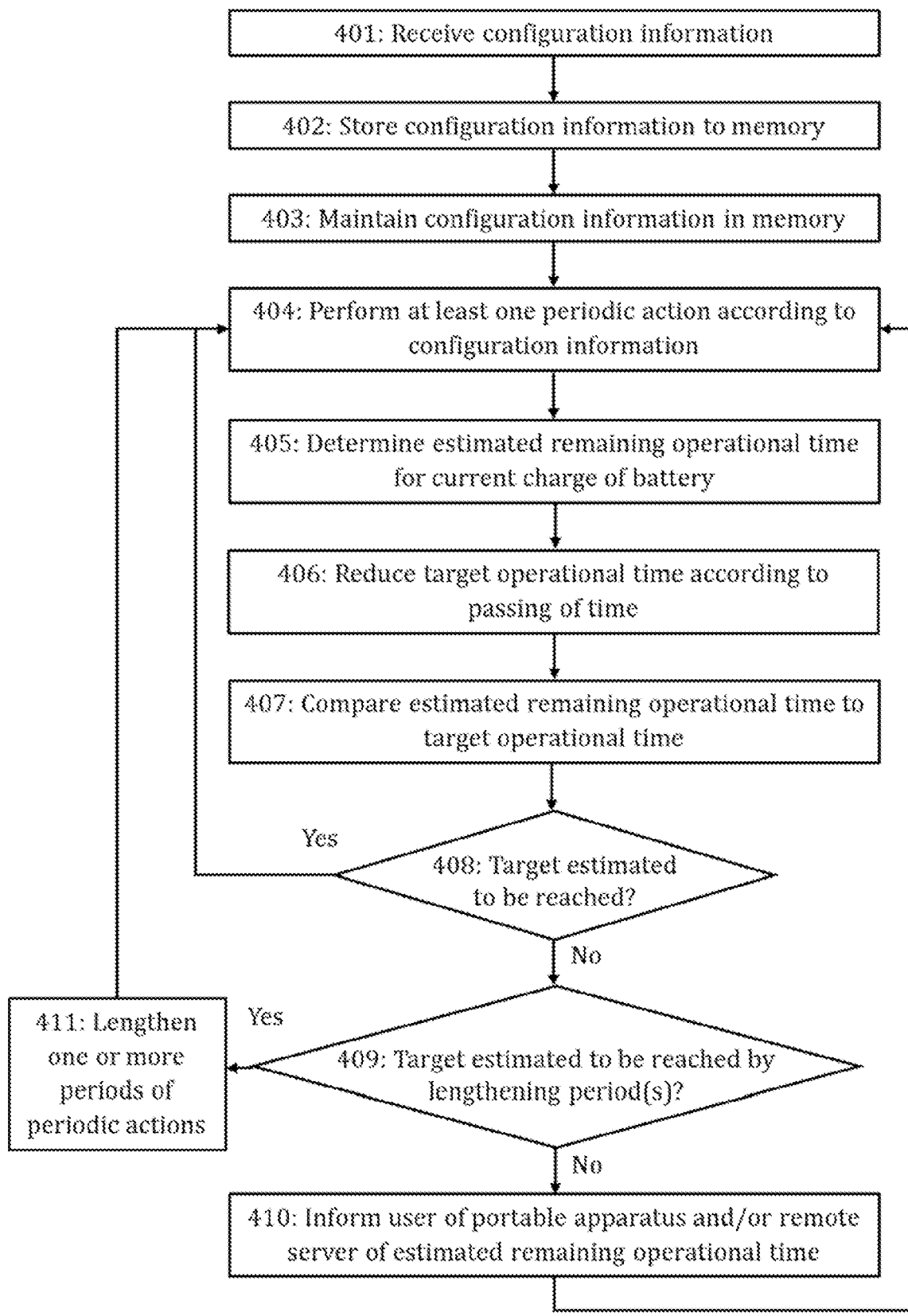

While the embodiments described in the previous paragraph provide an improvement in the operational time of the portable apparatus even though the target operational time is not reached, the user of the apparatus may still be taken by surprise and consequently disappointed by the dying of the battery sooner than expected. In FIG. 3, an embodiment addressing said issue is illustrated. Similar to FIG. 3, FIG. 4 illustrates a process executed by a portable apparatus connected to a remote server as discussed in relation to FIG. 2. Blocks 403 to 408 and 411 correspond to blocks 301 to 307 and will therefore not be repeated here for brevity.

In FIG. 4, the portable apparatus receives, in block 401, configuration information. The configuration information may be received, for example, from a remote server via a communications network as described also in relation to FIG. 3. In response to the receiving, the portable apparatus stores, in block 402, the configuration information to the memory of the portable apparatus. Before the configuration information is received in block 401, no configuration information may be maintained in the memory of the portable apparatus. Alternatively, previous configuration information (e.g., initial hard-coded configuration information) may be maintained already in the memory in which case the older configuration may be fully or partly overwritten in the storing in block 402.

It is assumed in FIG. 4 that the information on the one or more periodic actions, comprised in the configuration information received in block 401, comprises information on one or more time windows. Each time window may define an acceptable range (i.e., a lower limit and an upper limit) for a period of the one or more periods relating to one of the periodic actions performed by the portable apparatus. For example, a first periodic action pertaining to measurement of location may be performed with a period or time interval of 5-10 minutes while a second periodic action pertaining to reporting the measured location to the remote server may be performed with a period or time interval of 10-30 minutes). Any change (e.g., increase) in the periods of the periodic actions performed by the portable apparatus must comply with said time windows defined in the configuration information.

Referring to FIG. 4, if the estimated remaining operational time is determined to be shorter than the current target operational time in block 408, the portable apparatus estimates, in block 409, whether reducing the battery consumption by lengthening one or more periods within the one or more time windows leads to a remaining operational time at least equal to the (current) target operational time. If this is the case, that is, the current target operational time may reached, the portable apparatus lengthens the one or more periods, similar to block 307 of FIG. 3 though now taking into account also the one or more time windows. However, if the current target operational time cannot be reached, the portable apparatus informs, in block 410, at least one of a user of the portable apparatus via a user interface of the portable apparatus and the remote server or a secondary network device associated with the portable apparatus via the communications network of the estimated remaining operational time. For example, the user of the portable apparatus and/or users of secondary network devices associated with the portable device (e.g., caregivers for the user of the portable apparatus who cannot care fully for themselves) may be informed that due to poor cellular network coverage, the estimated remaining operational time of the device is, e.g., three days instead of four days. The user of the portable apparatus may be informed, for example, via a display of the portable apparatus and/or by sounding an alarm using a speaker of the portable apparatus. Similar means may also be used for informing the user of the secondary network device.

According to an exemplary embodiment it may be provided that if the user of the portable apparatus is informed of the estimated remaining operational time, the portable apparatus may further provide the user of the portable apparatus via the user interface instructions for improving the estimated operational time of the portable apparatus. For example, if the cause of the high battery consumption is weak (cellular) network signal, the instructions may suggest the user to position the portable apparatus in such a way that an improvement in the network signal is achieved. The one or more sets of instructions may be maintained in a memory of the portable apparatus. The most suitable set of instructions for the current scenario may be chosen to be provided for the user of the portable apparatus based on measurements on received signal strength conducted by the wearable apparatus.

Figure 5:
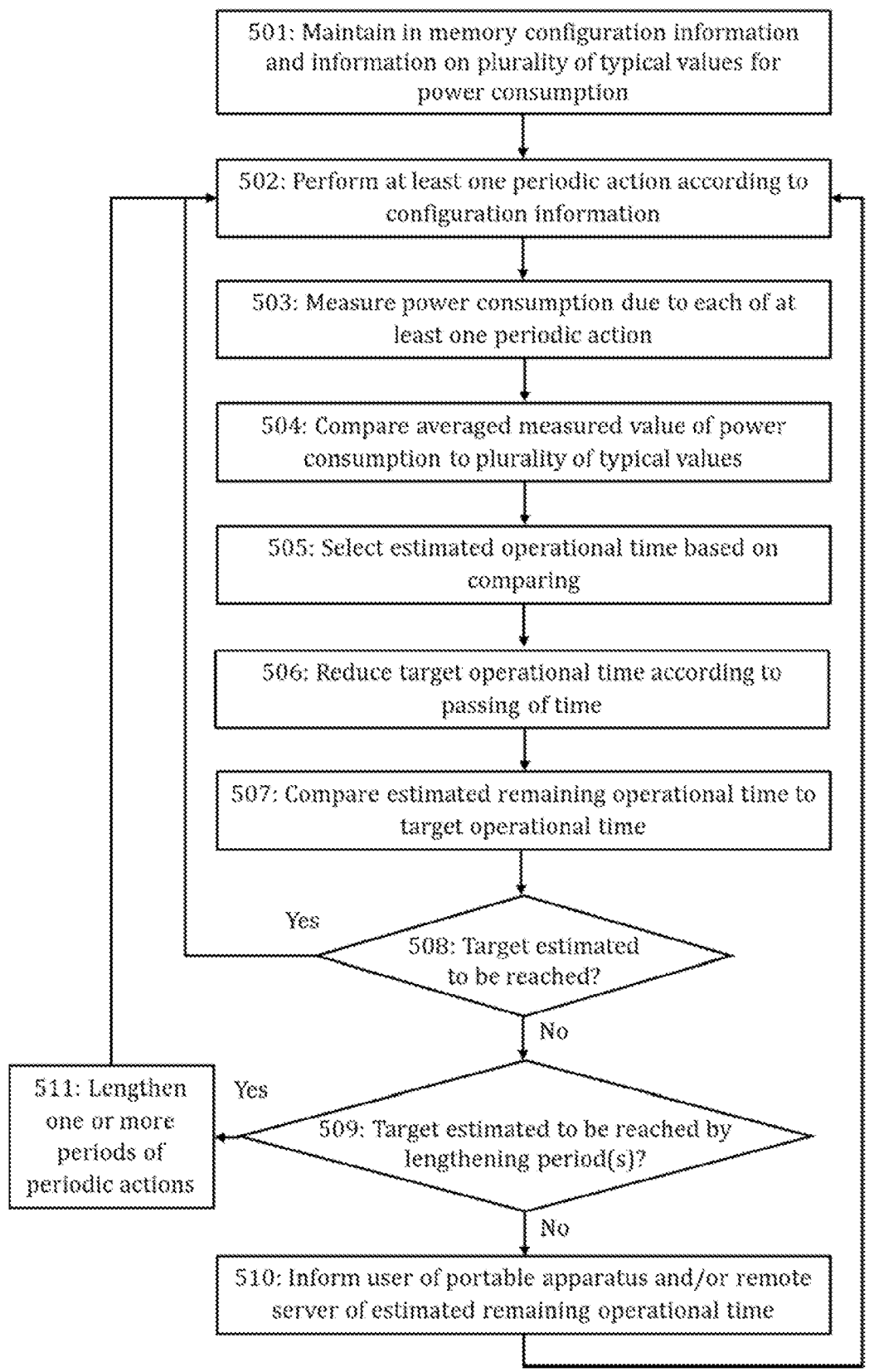

FIG. 5 illustrates another exemplary process executed by a portable apparatus according to an embodiment. The illustrated process corresponds largely to the embodiment illustrated in FIG. 4, but provides a more detailed example of how the estimated remaining operational time may be determined (as is done, e.g., in block 303 of FIG. 3 or block 405 of FIG. 4). Specifically, blocks 502, 506 to 511 correspond to blocks 404, 406 to 411 of FIG. 4 and will therefore not be repeated here for brevity.

Initially, the portable apparatus maintains, in block 501, in a memory of the portable apparatus configuration information (as described in relation to previous embodiments) as well as information on a plurality of typical power consumption values. Each typical power consumption value may correspond to a different operational time. The power consumption value may represent an electric charge (of the battery) consumed by the portable apparatus in a certain period of time and it may be given in ampere hours (Ah) or milliampere hours (mAh). Alternatively, the power consumption value may represent the electric energy consumed by the portable apparatus over a certain period time and it may be given, for example, in joules (J) or in kilowatt hours (kWh). In some alternative embodiments, the portable apparatus may have received said information on the plurality of typical power consumption values partly or fully from the remote server.

After the one or more periodic actions are performed in block 502, the estimated remaining operational time for the current charge of the battery is determined by performing, by the portable apparatus, the following. First, the portable apparatus measures, in block 503, individual power consumption values (e.g., given in milliampere hours) due to each of the one or more periodic actions. Second, the portable apparatus compares, in block 504, averaged measured power consumption value (i.e., an average of the individual power consumption values) to the plurality of typical power consumption values maintained in the memory. Third, the portable apparatus selects, in block 505, an estimated operational time corresponding to a typical power consumption value of the plurality of typical power consumption values closest to the averaged measured power consumption value or corresponding to the smallest typical power consumption value of the plurality of typical power consumption values that is larger than the averaged measured power consumption value. The first alternative gives on average a more accurate estimate though it may overestimate the operational time which may be a problem if the estimated operational time is close to the target operational time. In such a case, assuming no changes in the circumstances affecting the power consumption the target operational time may be seemingly reached in block 508 and lengthening of the period(s) of the one or more periodic actions is thus not performed in block 511, but the target operational time may be not actually be reached. The problem is further exacerbated if the number of typical power consumption values maintained in the memory is relatively small. The second alternative may not give as accurate estimations on average, but it may only underestimate (not overestimate) the operational time which is not as harmful in terms of the user experience as overestimation.

Figure 6:
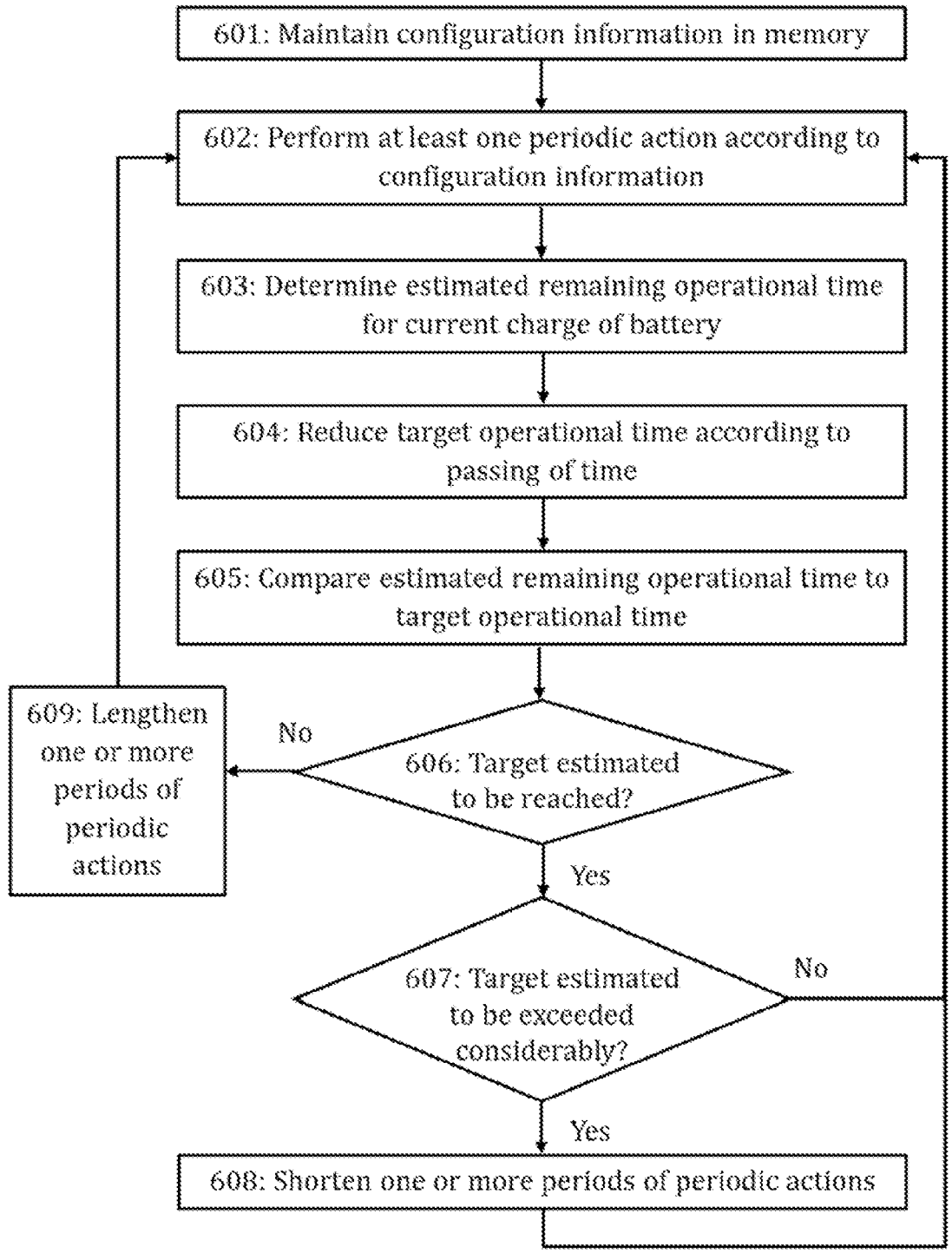

In the aforementioned embodiments, the one or more periods of the periodic actions are always lengthened in order to maintain the promised operational time for the battery of the apparatus. However, it may occur in some scenarios that one or more periods of periodic actions are, first, lengthened to achieve the target operational time and thereafter, for example, due to sudden, drastic improvement of the cellular network signal, the remaining operational time is estimated to considerably exceed the target operational time. While an increase in the operational time of the portable apparatus is obviously to the benefit of the user, it may be in some scenarios even more beneficial to be able to adjust the period(s) so that the previous periodicity of operations (e.g., pertaining to a period of reporting to the remote server) performed by the portable apparatus is partly or fully restored while still keeping the estimated operational time above the target operational time. A process for achieving said functionality is illustrated in FIG. 6. Said functionality is demonstrated in terms of the embodiment of FIG. 3 in the illustrated example, blocks 601 to 606 and 609 corresponding to blocks 301 to 307. However, it should be appreciated that said functionality may be combined with any of the other embodiments, e.g., the ones illustrated in FIGS. 4, 5 and 6, in a similar manner.

Referring to FIG. 6, actions performed by the portable apparatus in blocks 601 to 606 may be as discussed in relation to blocks 301 to 306 of FIG. 3. However, if it is determined in block 606 that the target operational time is estimated to be exceeded, it is further estimated in block 607 how large the difference between the estimated operational time and the target operational time is. If it is determined in block 607 that the difference exceeds a first threshold, the portable apparatus shortens, in block 608, one or more periods of periodic actions. The shortening may be performed so that the target operational time is estimated not to be compromised due to the change in the power consumption. For example, if the initial target operational time is one week, the first threshold may have a value of one day or even more so that small exceeding of the target operational time does not trigger the shortening of any periods of periodic actions. The first threshold may be maintained in the memory of the portable apparatus. It may have been received from the remote server as a part of the configuration information.

Figure 7:
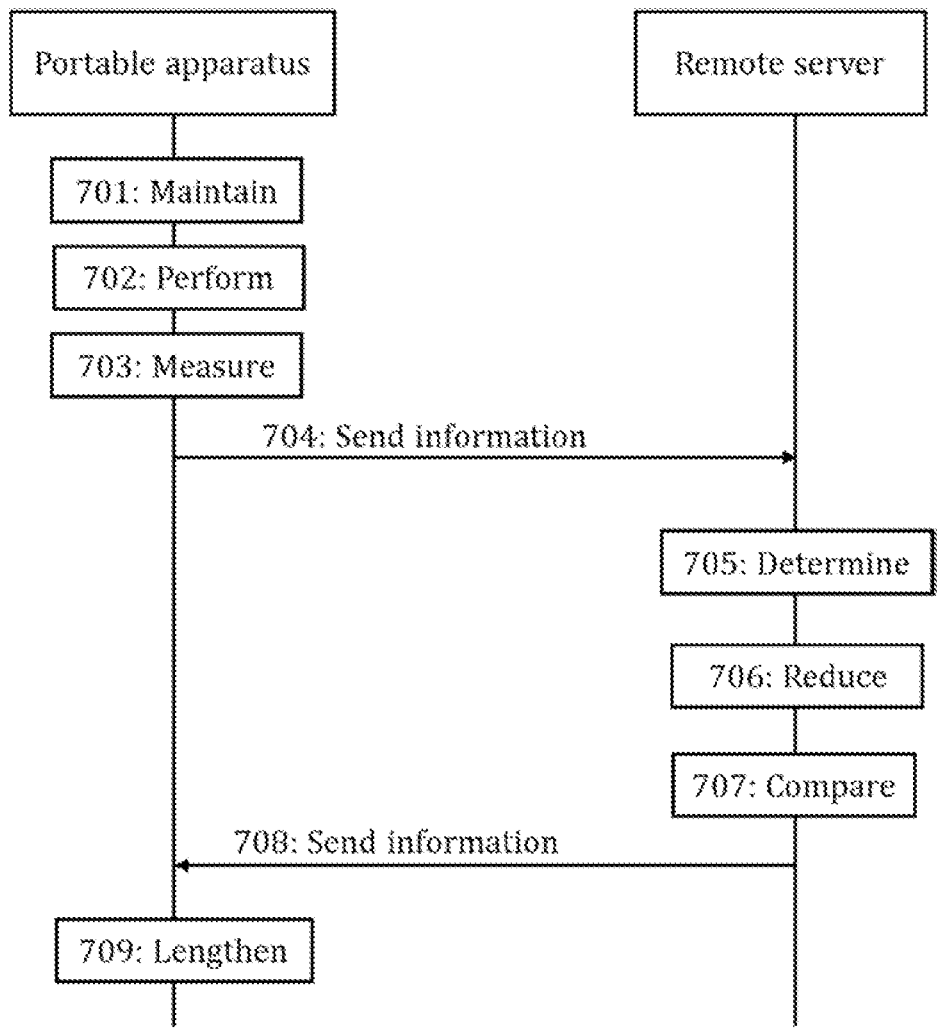

In the previous embodiments, the portable apparatus estimated the possibility for reaching the target operational time itself. In some alternative embodiments, one or more of said functionalities may be performed, instead of the portable apparatus, by the remote server. FIG. 7 illustrates an exemplary embodiment demonstrating such remote server functionalities. While the illustrated embodiment shows an alternative process for achieving the functionalities illustrated in FIG. 3, it should be appreciated that the remote server may be used to perform one or more of the processes attributed to the portable apparatus in any other previous embodiment in a similar manner.

Referring to FIG. 7, the portable apparatus initially maintains in a memory, in block 701, configuration information. Said configuration may have been hard-coded to the memory during the manufacturing of the portable apparatus, as discussed in relation to FIG. 2. The portable apparatus performs, in block 702, at least one of one or more periodic actions according to the configuration information (similar to, e.g., block 302 of FIG. 3). Thereafter, the portable apparatus measures, in block 703, the power consumption due to each of at least one periodic action as well as the current charge of the battery and causes sending, in message 704, information on at least said measurements to the remote server. In response to receiving said information, the remote server determines, in block 705, estimated remaining operational time for the current charge of battery of the portable apparatus based on the received information as well as information maintained in a memory of the remote server (e.g., information on a plurality of typical values for power consumption). The remote server reduces, in block 706, the target operational time according to passing of time and compares, in block 707, the estimated remaining operational time to the target operational time (corresponding to the initial target operational time adjusted to account for passing of time). The actions in blocks 706 and 707 may correspond, for example, to the actions in blocks 304 and 305 of FIG. 3.

In the illustrated example, it is assumed that the target operational time is estimated not to be reached based on the comparing in block 707. Therefore, the remote server causes sending, in message 708, information on the estimated failure to meet the target operational time to the portable apparatus. In response to receiving said information, the portable apparatus lengthens (or increases), in block 709, one or more periods of one or more respective periodic actions to reduce battery consumption, as described in relation to, e.g., block 307 of FIG. 3. If the target operational time is estimated to be reached based on the comparing in block 707, the remote server may simply not send any response or it may send an acknowledgment to the portable apparatus.

In some embodiments, some of the actions performed by the remote server in FIG. 7 may be performed by the portable apparatus. For example, the remote server may perform only the processes of block 705 after which the results of the determining in block 705 are sent to the portable apparatus and the processes of blocks 706, 707 and 709 are subsequently performed by the portable apparatus (assuming that the target operational time is not reached).

As previously mentioned in relation to FIG. 2, the communication of time intervals (or periods) within which the device should report changes may be done, for example, with Open Mobile Alliance (OMA) Lightweight Machine-to-Machine (LwM2M) protocol, Queuing Telemetry Transport (MQTT) protocol or Hypertext Transfer Protocol (HTTP). In the following example, the OMA LwM2M protocol is considered though it should be appreciated that similar functionalities may also be achieved using any of MQTT, HTTP, CoAP, AMQP, QUIC and XMPP.

Initially, the LwM2M server (a remote server as discussed above) may start observing a resource (a portable apparatus according an embodiment), i.e., perform an "Observe" operation via the "Information Reporting" interface, and set at least a minimum (pmin) and a maximum (pmax) reporting intervals, as defined in OMA LwM2M specification. With those pmin- and pmax-settings, the LwM2M server may indicate, respectively, the minimum and maximum intervals between consequent resource update reports. The LwM2M server may also provide further Notification Attributes Settings as defined in OMA LwM2M specification such as step, less-than, or greater than rules for Observe. When a LwM2M server sets pmin, pmax, and possibly step, less-than and greater-than rules, the portable apparatus may within those parameters choose when to send data updates according to an embodiment.

To give an example, the LwM2M server may give the following OMA LwM2M-specific parameters: pmin=10 (s), pmax=200 (s), step=50, lt=10 and gt=100. This definition sets the following limits or conditions or rules for sending an updated measurement report (i.e., for performing a "Notify" operation as defined in OMA LwM2M specification):

the portable apparatus may not send the report if less than 10 seconds (=pmin) has passed since last transmission of the measurement report (corresponding to a lower limit of a time window as discussed in relation to FIG. 4), the portable apparatus must send the report after 200 seconds (=pmax) has passed since the last transmission even if the measured value to be reported has not changed (corresponding to an upper limit of a time window as discussed in relation to FIG. 4), the portable apparatus must send the report if the measured value has changed by more than 50 (=step) compared to the previously transmitted value, the portable apparatus must send the report if the measured value is smaller than 10 (=lt) and the portable apparatus must send the report if the measured value is larger than 100 (=gt).

If the measured value changes by less than 50 after 11 seconds and is between 10 and 100, the portable apparatus may either send an updated measured value immediately, or postpone the sending until 200 seconds has passed. The three latter limits may correspond to a highly atypical measurement result indicating a possible (medical) emergency (e.g., an elevated heart rate, a high accelerometer value indicating a fall or an unwanted location value indicating a breach of a geo-fence) and thus may be defined to be prioritized over any period defined for the reporting according to any embodiments illustrated in FIGS. 2 to 6. In other words, the rules as defined above and given in OMA LwM2M specification provide a time window and other restrictions which limit when the portable apparatus may or should send a report. Embodiments provide help for deciding when the report should be sent so that target operational time of the portable apparatus is reached as well as enabling changing also the periods of the measurements and other non-reporting actions performed by the portable apparatus. It should be appreciated the values given above to pmin, pmax, lt, step and gt demonstrate only one non-limiting example of how said parameters may be defined.

Figure 8:
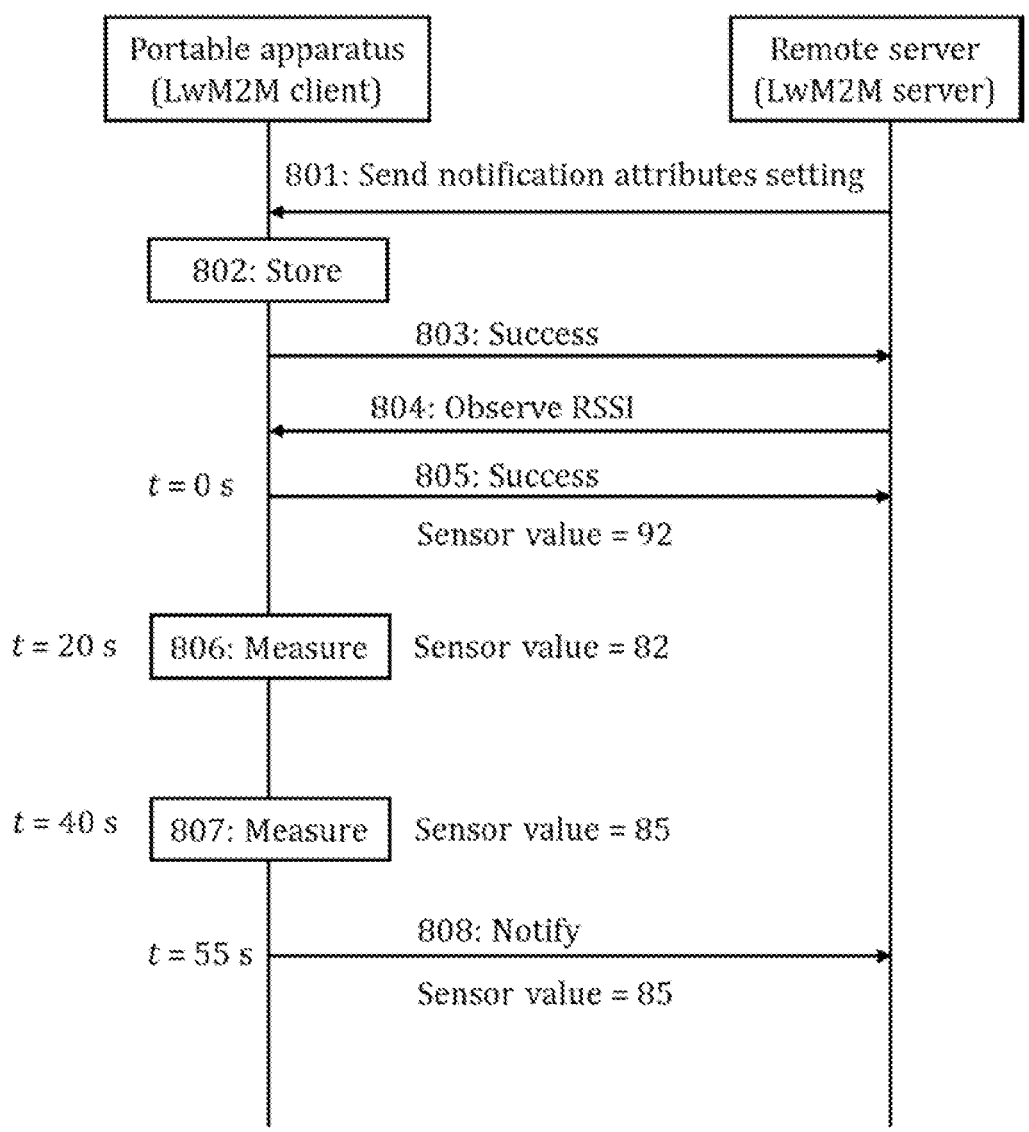

FIG. 8 illustrates in a signalling diagram communication between a portable apparatus and a remote server within OMA LwM2M framework according to an embodiment. In terms of the OMA LwM2M framework, the portable apparatus and the remote server correspond to (or comprise) in this case a LwM2M client and a LwM2M server. While some of the terms used in FIG. 8 are specific to OMA LwM2M framework, it should be appreciated other M2M solutions may be used to provide similar processes and signalling according to other embodiments. It should be appreciated that FIG. 8 illustrates only some of the actions performed by the remote server and the portable apparatus, namely the actions relating at least implicitly to the M2M communication. Referring to FIG. 8, the LwM2M server (i.e., the remote server) causes, in message 801, sending Notification Attributes Settings (i.e., configuration information) to the LwM2M client (i.e., the portable apparatus). Notification Attributes Settings may be as described in the earlier example, i.e., pmin=10, pmax=200, step=50, lt=10 and gt=100. Other configuration information pertaining to, for example, measurements to be performed by the portable apparatus may already be maintained in a memory of the portable apparatus.

The LwM2M client receives, in block 802, the notification attributes settings and stores, in block 802, them to a memory. The LwM2M client further causes, in message 803, sending a message to the LwM2M server informing the LwM2M server that the Notification Attributes Settings were received and stored (or written) successfully. Thereafter, the LwM2M server may start observing received signal strength indication (RSSI) value by performing, in message 804, an Observe operation (i.e., causing sending a message informing the LwM2M client that the LwM2M server is ready to receive periodic updates regarding a measured value). In response to the Observe operation, the LwM2M client causes sending in message 805 the current measured value to the LwM2M server. This message acts also a confirmation that Observe operation was successful (i.e., the message was received and understood by the LwM2M client). The sending of the message 805 further acts as a starting point for a timer measuring the time between consequent transmissions of measured value to the LwM2M server.

The LwM2M client performs, in block 806, according to its configuration information a first measurement after 20 seconds has passed after the starting of the timer. In this example, a value of 82 is measured, in block 806, by the portable apparatus using a sensor comprised in or connected to the portable apparatus. According to the Notification Attributes Setting, this value or the value of the timer does not necessitate immediate transmission. Moreover, it is assumed in this case that in order to meet the target operational time (determined by the portable apparatus, e.g., in response to sending the message 805 or prior to the illustrated signalling according to any of earlier embodiments), a period of at least 55 seconds between consequent reports is required. Therefore, the transmission of the measured information is postponed.

After 40 seconds has passed, a value of 85 is measured, in block 807, by the portable apparatus using said sensor. Again, it is determined that the measured value or the value of the timer does not necessitate transmission while the target operational time may be jeopardized if the transmission is performed at this time (i.e., with a period of 40 seconds).

After 55 seconds has passed since the starting of the timer, it is determined that the period for the reporting of the measured value which enables meeting the target operational time for the portable apparatus is reached and thus the LwM2M client causes performing in message 808 a Notify operation as specified in OMA LwM2M specification, that is, sending a message comprising information on the most recent measured value to the LwM2M server.

The processes illustrated by blocks/messages 806 to 808 may correspond to the performing of at least one periodic action according to the configuration information as illustrated in block 302 of FIG. 3, block 404 of FIG. 4, block 502 of FIG. 5, block 602 of FIG. 6 and/or block 702 of FIG. 7. Thus, following the sending of message 808, the portable apparatus may perform the determining of the estimated remaining operational time for the current charge of the battery (or specifically the measuring of the power consumption as in, e.g., block 503 of FIG. 5) and any consequent processes as described in relation to any of the embodiments illustrated in FIGS. 3 to 7.

While FIG. 8 illustrates a case where a single periodic measurement is performed by the portable apparatus, in other embodiments two or more different periodic measurements (e.g., a measurement of a location and at least one physiological measurement) may be performed and reported periodically to the remote server. In such a case, the reporting of the measurement results may be organized independently for each of the two or more measurements as illustrated in FIG. 8 for a single periodic measurement. Alternatively, the most recent measured values pertaining to all the different measurements may be reported in a single message. In such a case, a single shared period and settings may be defined for the reporting.

While the example of FIG. 8 was described in terms of terminology specific OMA LwM2M, similar functionality and rules for sending an updated measurement report may be defined for the aforementioned alternative protocols. According to an exemplary embodiment it may be provided that if the one or more periodic actions comprise at least the one or more periodic measurements of one or more different types and the one or more periodic transmissions of measurement information to the remote server, the configuration information comprises for each type of measurement one or more rules defining when transmitting measurement information to the remote server is allowed or when transmitting measurement information to the remote server is allowed to be triggered immediately, the one or more rules comprising one or more of the following:

the measurement information is allowed to be transmitted if a time between the most recent measurement and the most recent measurement transmitted to the remote server is greater than a second threshold value defined in the configuration information;

the measurement information is to be transmitted immediately if the time between the most recent measurement and the most recent measurement of which the remote server was informed is greater than a third threshold value defined in the configuration information;

the measurement information is to be transmitted immediately if an absolute difference between the most recent measured value and the most recent measured value transmitted to the remote server is above a fourth threshold value defined in the configuration information;

the measurement information is to be transmitted immediately if the most recent measured value is below a fifth threshold value defined in the configuration information; and the measurement information is to be transmitted immediately if the most recent measured value is above a sixth threshold value defined in configuration information.

The blocks, related functions, and information exchanges described above by means of FIGS. 3 to 8 are in no absolute chronological order, and some of them may be performed simultaneously or in an order differing from the given one.

Figure 9:
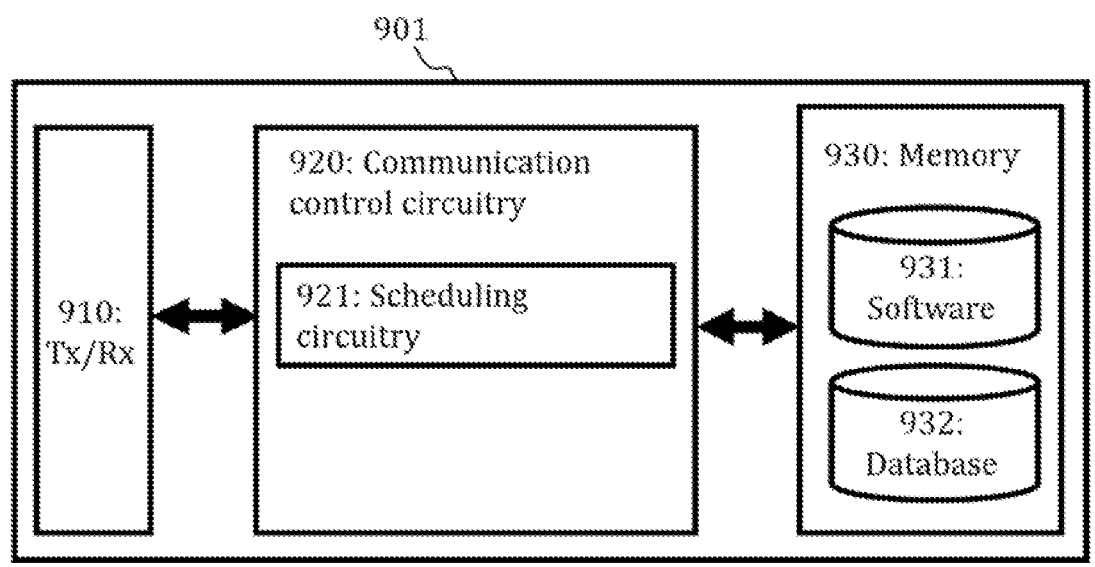
FIG. 9 illustrates an exemplary apparatus according to an embodiment.

FIG. 9 illustrates an exemplary apparatus 901 configured to carry out the functions described above in connection with the portable apparatus 201 of FIG. 2. The apparatus 901 may be an electronic device comprising electronic circuitries. The apparatus 901 may be powered by at least one battery (not shown in FIG. 9). The apparatus 901 may be connected to at least one remote server 220 via a communications network 210. The apparatus 901 may be a separate network entity or a plurality of separate entities. The apparatus 901 may comprise a communication control circuitry 920 such as at least one processor, and at least one memory 930 including a computer program code (software) 931 wherein the at least one memory 930 and the computer program code (software) 931 are configured, with the at least one processor, to cause the apparatus to carry out any one of the embodiments of the portable apparatus described above.

The memory 930 may be implemented using any suitable data storage technology, such as semiconductor based memory devices, flash memory, magnetic memory devices and systems, optical memory devices and systems, fixed memory and removable memory. The memory may comprise a database 932 which may comprise a white list and a black list comprising information on the data servers allowed and not allowed or unable to use the cache server as described in previous embodiments. The database 932 may further comprise monitoring data related to data traffic to and from the data servers and to and from the cache server and cache server status data. The memory 930 may be connected to the communication control circuitry 920 via an interface.

The apparatus 901 may further comprise a communication interface (Tx/Rx) 910 comprising hardware and/or software for realizing communication connectivity according to one or more communication protocols. The communication interface may provide the apparatus 901 with communication capabilities to communicate in the cellular communication system and enable communication with network nodes and terminal devices, for example. The communication interface (Tx/Rx) 910 may comprise an interface for a battery for powering the apparatus 901 as well as one or more interfaces for one or more sensors as described in detail in relation to FIG. 1. The communication interface 910 may comprise standard well-known components such as an amplifier, filter, frequency-converter, (de) modulator, and encoder/decoder circuitries and one or more antennas.

Referring to FIG. 9, the communication control circuitry 920 may comprise scheduling circuitry 921 configured to monitor and control the scheduling of one or more periodic or semiperiodic actions performed by the portable apparatus 901. The scheduling circuitry 921 may be configured to carry out at least some of the processes illustrated in any of FIGS. 3 to 6 and/or in blocks/messages 701 to 704, 709 of FIG. 7 and/or in blocks/messages 802, 803, 805, 806, 807, 808 of FIG. 8. In some embodiments, second circuitry (not shown in FIG. 9) comprised in the communication control circuitry may be configured to perform at least some of the processes illustrated in any of FIGS. 3 to 6 and/or in blocks/messages 701 to 704, 709 of FIG. 7 and/or in blocks/messages 802, 803, 805, 806, 807, 808 of FIG. 8. For example, the second circuitry may be dedicated circuitry for performing power measurements. For example, said dedicated circuitry may be configured to perform at least in part any of processes illustrated by, e.g., blocks 303 of FIG. 3, block 405 of FIG. 4, block 503 of FIG. 5 and/or block 703 of FIG. 7.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device In an embodiment, at least some of the processes described in connection with FIGS. 3 to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 3 to 8 or operations thereof.

According to an exemplary embodiment it may be provided that the apparatus is one of a portable apparatus, a wearable apparatus, a mobile phone and a tablet computer According to an exemplary embodiment it may be provided that the means for performing the at least one of the one or more periodic actions comprise one or more of means for transmitting information to a remote server via a communications network, a location sensor, a gyroscopic sensor, an orientation sensor, an accelerometer and one or more physiological sensors The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art. Embodiments as described may also be carried out in the form of a computer process defined by a computer program or portions thereof. Embodiments of the methods described in connection with FIGS. 3 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A portable apparatus comprising:
a processor; and
a non-transitory memory including instructions, the instructions, when executed by the processor, cause the apparatus to:
maintain in the memory configuration information comprising at least information on a target operational time of the apparatus and information on one or more periodic actions scheduled to be performed periodically by the apparatus;
perform a periodic action from the one or more periodic actions according to the configuration information;
measure power consumption due to each of the one or more periodic actions;
determine an estimated remaining operational time for a current charge of a battery powering the apparatus based on the measured power consumption;
reduce the target operational time according to passing of time;
compare the estimated remaining operational time to the target operational time;
lengthen one or more periods of one or more respective periodic actions defined in the configuration information to reduce battery consumption in response to the estimated remaining operational time being shorter than the target operational time; and
maintain, in the memory of the portable apparatus, information on a plurality of power consumption values, each power consumption value of the plurality of power consumption values corresponding to a different operational time, wherein the estimated remaining operational time for the current charge of the battery is determined by at least performing, by the portable apparatus, the following:
compare an averaged measured power consumption value to the plurality of power consumption values maintained in the memory; and
select an operational time corresponding to a power consumption value of the plurality of power consumption values maintained in the memory and closest to the averaged measured power consumption value or to a smallest power consumption value of the plurality of power consumption values maintained in the memory that is larger than the averaged measured power consumption value.

2. An apparatus according to claim 1, further configured to:
in response to receiving the configuration information from a remote server via a communications network, store the configuration information to the memory.

3. An apparatus according to claim 1, further configured to:
in response to the estimated remaining operational time exceeding the target operational time at least by a first threshold value defined in the configuration information, shorten one or more periods of the one or more respective periodic actions.

4. An apparatus according to claim 2, wherein the information on the one or more periodic actions comprises one or more time windows, each time window defining a lower limit and an upper limit for a period of a periodic action of the one or more periodic actions, the lengthening of the one or more periods being limited by the one or more time windows.

5. An apparatus according to claim 4, further configured to:
in response to the estimated remaining operational time being shorter than the target operational time, and in response to the lengthening of one or more periods limited by the one or more time windows being estimated to lead to a remaining operational time shorter than the target operational time, inform, by the portable apparatus, at least one of a user of the portable apparatus via a user interface of the portable apparatus or the remote server or a secondary network device associated with the portable apparatus via the communications network of the estimated remaining operational time; otherwise, perform the lengthening of the one or more periods limited by the one or more time windows.

6. An apparatus according to claim 1, further configured to:
in response to the estimated remaining operational time being shorter than the current target operational time, reduce, by the portable apparatus, power consumption of secondary functions of the portable apparatus in addition to the lengthening of the one or more periods to reduce the battery consumption to meet the current target operational time.

7. An apparatus according to claim 1, wherein the determining of the estimated remaining operational time for the current charge of the battery is based on one or more of current uptime, remaining battery power, estimated operational power consumption and estimation of data transmission event cost.

8. An apparatus according to claim 1, wherein the one or more periodic actions comprise one or more of the following: one or more periodic measurements of one or more different types, one or more periodic transmissions of measurement information to the remote server or one or more periodic transmissions of secondary information to the remote server.

9. An apparatus according to claim 8, wherein the one or more periodic measurements comprise one or more periodic measurements using one or more sensors of at least one of location, orientation, acceleration or at least one physiological signal of a user of the portable apparatus.

10. An apparatus according to claim 9, wherein the one or more periodic measurements of location comprise measurements of location of the portable apparatus within a predefined geo-fence based on one or more of Global Positioning System, WiFi, Bluetooth and Bluetooth Low Energy and the one or more measurements of the physiological signals of the user of the portable apparatus comprise one or more of a measurement of heart rate, a measurement of pulse or a measurement of posture.

11. An apparatus according to claim 8, wherein if the one or more periodic actions comprise at least the one or more periodic measurements of the one or more different types and the one or more periodic transmissions of measurement information to the remote server, the configuration information comprises for each type of measurement one or more rules defining when transmitting measurement information to the remote server is allowed or when transmitting measurement information to the remote server is allowed to be triggered immediately, the one or more rules comprising one or more of the following:
the measurement information is allowed to be transmitted if a time between the most recent measurement and the most recent measurement transmitted to the remote server is greater than a second threshold value defined in the configuration information;
the measurement information is to be transmitted immediately if the time between the most recent measurement and the most recent measurement of which the remote server was informed is greater than a third threshold value defined in the configuration information;
the measurement information is to be transmitted immediately if an absolute difference between the most recent measured value and the most recent measured value transmitted to the remote server is above a fourth threshold value defined in the configuration information;
the measurement information is to be transmitted immediately if the most recent measured value is below a fifth threshold value defined in the configuration information; and the measurement information is to be transmitted immediately if the most recent measured value is above a sixth threshold value defined in configuration information.

12. An apparatus according to claim 11, wherein communication between the portable apparatus and the remote server and implementation of the one or more rules is conducted using one or more of Open Mobile Alliance Lightweight Machine-to-Machine, OMA LwM2M, protocol, Message Queuing Telemetry Transport, MQTT, Hypertext Transfer Protocol, HTTP, Constrained Application Protocol, CoAP, Advanced Message Queuing Protocol, AMQP, Quick User Datagram Protocol Internet Connections, QUIC, or Extensible Messaging and Presence Protocol, XMPP.

13. A method, by a portable apparatus, comprising:
maintaining configuration information comprising at least information on a target operational time of the portable apparatus and information on one or more periodic actions scheduled to be performed periodically by the portable apparatus;
performing the one or more periodic actions according to the configuration information;
measuring power consumption due to each of the one or more periodic actions;
determining an estimated remaining operational time for a current charge of a battery powering the portable apparatus based on the measured power consumption;
reducing the target operational time according to passing of time;
comparing the estimated remaining operational time to the target operational time;
in response to the estimated remaining operational time being shorter than the target operational time, lengthening, by the portable apparatus, one or more periods of one or more respective periodic actions defined in the configuration information to reduce battery consumption; and
in response to receiving the configuration information from a remote server via a communications network, storing, by the portable apparatus, the configuration information to a memory;
wherein the information on the one or more periodic actions comprises one or more time windows, each time window defining a lower limit and an upper limit for a period of a periodic action of the one or more periodic actions, the lengthening of the one or more periods being limited by the one or more time windows.

14. A method according to claim 13, further comprising:
in response to the estimated remaining operational time exceeding the target operational time at least by a first threshold value defined in the configuration information, shortening, by the portable apparatus, one or more periods of one or more respective periodic actions.

15. A method according to claim 13, further comprising:
in response to the estimated remaining operational time being shorter than the target operational time, if lengthening of one or more periods limited by the one or more time windows is estimated to lead to a remaining operational time shorter than the target operational time, informing, by the portable apparatus, at least one of a user of the portable apparatus via a user interface of the portable apparatus or the remote server or a secondary network device associated with the portable apparatus via the communications network of the estimated remaining operational time; otherwise, lengthening the one or more periods limited by the one or more time windows.

16. A method according to claim 13, further comprising:
in response to the estimated remaining operational time being shorter than the current target operational time, reducing, by the portable apparatus, power consumption of secondary functions of the portable apparatus in addition to the lengthening of the one or more periods to reduce the battery consumption to meet the current target operational time.

17. A non-transitory computer medium comprising instructions for causing a portable apparatus to perform at least the following:
maintain in a memory configuration information comprising at least information on a target operational time of the apparatus and information on one or more periodic actions scheduled to be performed periodically by the apparatus;
perform a periodic action from the one or more periodic actions according to the configuration information;
measure power consumption due to each of the one or more periodic actions;
determine an estimated remaining operational time for a current charge of a battery powering the apparatus based on the measured power consumption;
reduce the target operational time according to passing of time; compare the estimated remaining operational time to the target operational time;
in response to the estimated remaining operational time being shorter than the target operational time, lengthen one or more periods of one or more respective periodic actions defined in the configuration information to reduce battery consumption;
wherein the one or more periodic actions comprise: one or more periodic measurements;
wherein the one or more periodic measurements comprise one or more periodic measurements using one or more sensors of at least one location and at least one physiological signal of a user of the portable apparatus;
wherein the one or more periodic measurements of location comprise measurements of location of the portable apparatus within a pre-defined geo-fence based on one or more of Global Positioning System, WiFi, Bluetooth or Bluetooth Low Energy and the one or more measurements of the at least one physiological signal of the user of the portable apparatus comprise one or more of a measurement of heart rate, a measurement of pulse or a measurement of posture.

* * * * *